Oct. 3, 1967 R. J. BLACK ETAL 3,345,019
AIRCRAFT LANDING GEAR
Filed Dec. 30, 1965
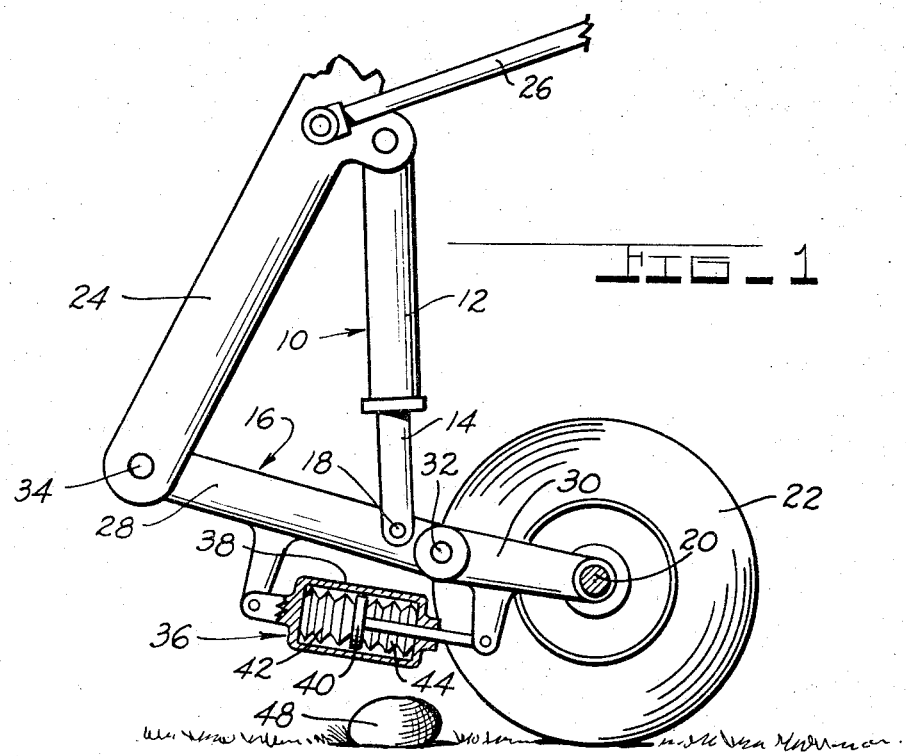
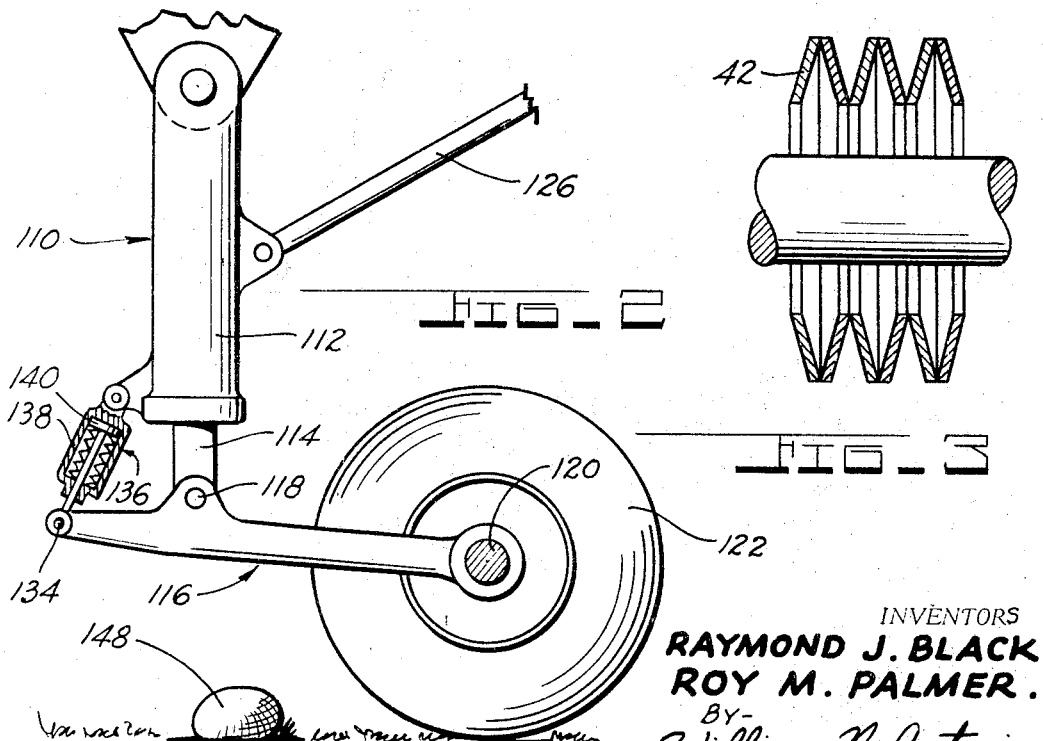
INVENTORS
RAYMOND J. BLACK
ROY M. PALMER.
BY-
William N. Antonis
ATTORNEY.

United States Patent Office 3,345,019
Patented Oct. 3, 1967

3,345,019
AIRCRAFT LANDING GEAR
Raymond Joseph Black and Roy M. Palmer, South Bend, Ind., assignors to The Bendix Corporation, a corporation of Delaware
Filed Dec. 30, 1965, Ser. No. 517,689
1 Claim. (Cl. 244—100)

ABSTRACT OF THE DISCLOSURE

The following relates to the use of a linkage arrangement on an aircraft landing gear which includes a secondary shock absorber, for use in conjunction with a conventional primary shock absorber, wherein the secondary shock absorber functions independently of the primary shock absorber to alleviate bump impact loads. The linkage arrangement divides the conventional unsprung mass of the landing gear into a secondary sprung mass and a secondary unsprung mass so that relative movement therebetween is damped by the secondary shock absorber.

---

This invention relates to aircraft landing gear and more particularly to a gear for landing on rough terrain.

Theoretical and experimental studies of the problem of landing and taxiing over rough terrain have shown that two approaches are possible for designing landing gear which is suitable for use on such terrain. The first approach is to utilize large tire sizes so that the obstacle height can be absorbed by tire deflection alone. The second approach, which can be used for wave lengths on the order of ten inches at speeds up to 100 knots, is to have the tire essentially bottom and the axle move to accommodate a percentage of the height.

The second approach, which is the one with which this invention is concerned, results in very high loads on the wheel and also on the airframe proper. This is true even if the shock strut has a hydraulic load alleviation device. Some of the reasons for such high loads are that: (a) Hydraulic alleviation is only partially effective, since stroke velocities are very high, and even with practical increases in the orifice area, by use of poppet valves or "band pass" orifice control, the hydraulic load is appreciable; (b) For a typical shock strut the near-bottomed strut position has large air resistance and a very large rate of air force vs. strut displacement; and (c) The entire unsprung mass must be accelerated in order to move the axle a sufficient amount to traverse the obstacle.

With the foregoing thoughts in mind, it is an object of this invention to provide an improvement in all three of the above items from the standpoint of bump-impact load alleviation.

More specifically, it is an object of this invention to provide a secondary shock absorber for use in conjunction with a conventional primary or main shock absorber which functions independently of the primary shock absorber to alleviate bump impact loads.

In other words, it is an object of this invention to provide an independent secondary stroking member which allows wheel axle movement during bump impact without stroking the primary or main shock absorber of the landing gear system.

Generally speaking, it is an object of this invention to provide a landing gear for an aircraft having a primary sprung mass and a primary unsprung mass which includes linkage means for dividing the primary unsprung mass into a secondary sprung mass and a secondary unsprung mass, a primary shock absorber connected between the primary sprung mass and the primary unsprung mass, and a secondary shock absorber connected between the sprung masses and the secondary unsprung mass, said primary shock absorber being a part of said secondary sprung mass during stroking of said secondary shock absorber.

The above and other objects and features of this invention will become apparent from the following description taken in connection with the accompanying drawing which forms a part of this disclosure and in which:

FIGURE 1 is a diagrammatic view, partially in section, showing a landing gear arrangement which incorporates the invention;

FIGURE 2 is an additional diagrammatic view, partially in section, showing another landing gear arrangement which incorporates the invention; and FIGURE 3 is an enlarged sectional view of a portion of one type of secondary shock absorber which may be used in connection with the invention.

Referring to FIGURE 1, it will be seen that numeral 10 designates a conventional primary shock absorber or strut which includes an upper cylindrical telescopic member 12 and a lower piston-like telescopic member 14, the upper of which is connected to and is a part of the primary sprung mass and the lower of which is connected to and is a part of the primary unsprung mass. As used herein, the primary sprung mass includes the aircraft (not shown) and associated structure, whereas the primary unsprung mass includes the wheel assembly and wheel carrying structure.

A horizontally disposed lever 16 is pivotally connected at 18 to the lower telescopic member 14 of the primary shock absorber. One end of the lever 16 is suitably connected to the axle 20 of a ground engaging wheel 22, whereas the other end of the lever is pivotally connected to the upper telescopic member 12 of the primary shock absorber and to the aircraft (not shown) through suitable means, such as link 24 and drag brace 26. In FIGURE 1, it will be noted that the horizontally disposed lever 16 is formed of two links 28 and 30 which are pivotally connected to each other at 32, said pivotal connection 32 being located between the wheel axle 20 and the pivotal connection 18. A secondary shock absorber 36, which includes a telescopic cylindrical member 38 and a telescopic piston-like member 40, is arranged so that one of the telescopic members is suitably connected to link 28 of the lever 16 and the other telescopic member is suitably connected to the other link 30 of the lever 16. Located within the cylindrical member 38 and on either side of the piston member 40 are two stacks of preloaded Belleville washers, indicated generally by the numerals 42 and 44. Although the secondary shock absorber 36 is shown in conjunction with stacked preloaded Belleville washers, it will be understood that other suitable shock absorbers may be utilized, such as an oil spring in combination with a viscous shear resistance around the circumference of the piston.

In the foregoing arrangement the primary sprung mass includes telescopic member 12 of the primary shock absorber 10 and link 24. The primary unsprung mass includes telescopic member 14 of the primary shock absorber 10, links 28 and 30 of lever 16, wheel 22, and the secondary shock absorber 36 per se. Thus, during stroking of the primary shock absorber 10, telescoping member 14 is part of the primary unsprung mass. However, insofar as the secondary shock absorber 36 is concerned it will be noted that the linkage arrangement is such that the primary unsprung mass is divided into a secondary sprung mass and a secondary unsprung mass. Thus, during stroking of the secondary shock absorber 36, telescoping cylinder 38 of the secondary shock absorber, link 28 of lever 16, and telescoping member 14 of the primary shock absorber are part of the secondary sprung mass. The secondary unsprung mass would include only the telescopic member 40 of the secondary shock absorber, link 30 of lever 16, and wheel 22.

With the foregoing landing gear arrangement it will be evident to those skilled in the art that the additional hinge point 32 between links 28 and 30 of lever 16 permits movement of the axle 20 and wheel 22 in a vertical direction upon impact with a rock or bump 48 without stroking the primary shock absorber 10. In other words by utilizing an independent stroking secondary shock absorber in the arrangement shown, wheel axle movement upon bump impact is permitted without stroking of the main or primary shock absorber.

Although the spring rate of the secondary shock absorber will depend on design requirements, it has been found that a secondary shock absorber which comes into operation at load levels corresponding to a 90–95% bottomed tire condition is quite suitable. It will also be understood that the secondary unsprung mass is less than the primary unsprung mass and that the effective spring rate of the secondary shock absorber is less than the effective spring rate of the primary shock absorber within the operative load range of the secondary shock absorber, so that deflection of the axle can be achieved with reasonable bottomed-tire load levels. However, it should be understood that the effective spring rate of the secondary shock absorber is considerably greater than that of the primary shock absorber in the near-fully extended position of the primary shock absorber. Thus, it does not interfere with the operation of the primary shock absorber under normal (no bump impact) conditions.

FIGURE 2 shows the invention incorporated into another type of landing gear. In this embodiment like parts are designated by like numerals plus 100. The numeral 110 designates a conventional primary shock absorber or strut which includes an upper cylindrical telescopic member 112 and a lower piston-like telescopic member 114, the upper of which is connected to and is part of the primary sprung mass and the lower of which is connected to and is a part of the primary unsprung mass. A horizontally disposed lever 116 is pivotally connected at 118 to the lower telescopic member 114 of the primary shock absorber. One end of the lever 116 is suitably connected to the axle 120 of a ground engaging wheel 122. The other end of the lever is pivotally connected to the upper telescopic member 112 of the primary shock absorber through means of secondary shock absorber 136. The secondary shock absorber includes a telescopic cylindrical member 138 and a telescopic piston member 140, one of which is suitably connected to the upper telescopic member 112 of the primary shock absorber and the other of which is connected to the other end of lever 116.

In the embodiment of FIGURE 2, the primary sprung mass includes telescopic member 112 of the primary shock absorber 110 and both of the telescopic members 138 and 140 of the secondary shock absorber 136. The primary unsprung mass includes telescopic member 114 of the primary shock absorber 110, lever 116, and wheel 122. Thus, during stroking of the primary shock absorber 110, telescoping member 114 is part of the primary unsprung mass. However, insofar as the secondary shock absorber 136 is concerned, the linkage arrangement of this embodiment is also such that the primary unsprung mass is divided into a secondary sprung mass and a secondary unsprung mass. Thus, during stroking of the secondary shock absorber 136, telescoping member 114 of the primary shock absorber becomes part of the secondary sprung mass and telescoping member 140 of the secondary shock absorber becomes part of the secondary unsprung mass. In this embodiment stroking of the secondary shock absorber 136 will result in pivoting about point 118, whereas stroking of the primary shock absorber will result in pivoting about point 134. Functionally, the operation of the second embodiment is essentially the same as the first embodiment.

The foregoing landing gear arrangements have the following advantages over conventional arrangements:

(1) Large additional axle stroke capability even with a bottomed tire and strut;
(2) Low rate of load buildup per unit axle reflections, under bump loading conditions, as compared to conventional air-spring shock struts; and
(3) Reduced loads for bump impact in the intermediate wave length range (wave lengths of approximately 10 to 40 inches).

The above advantages which flow from our novel inventive combination are believed to be obvious from the above description and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, we do not desire to be limited to the specific embodiment disclosed herein primarily for purposes of illustration, but instead desire protection falling within the scope of the appended claim.

Having thus described the various features of the invention, what we claim as new and desire to secure by Letters Patent is:

In a landing gear for an aircraft having a primary sprung mass and a primary unsprung mass, the combination therewith of linkage means for dividing said primary unsprung mass into a secondary sprung mass and a secondary unsprung mass, a primary shock absorber operatively connected between said primary sprung mass and said primary unsprung mass for damping relative movement therebetween, said primary shock absorber including a first telescopic member which is connected to and is a part of said primary sprung mass and a second telescopic member which is connected to and is a part of said primary unsprung mass during stroking of said primary shock absorber, said primary unsprung mass including a generally horizontally disposed lever pivotally connected between the ends thereof to said second telescopic member of said primary shock absorber and ground engaging wheel means rotatably mounted at one end of said lever, said other end of said lever being pivotally connected to said first telescopic member of said primary shock absorber, said horizontally disposed lever being formed of first and second links pivotally connected to each other, said pivotal connection of said first link with said second link being located between said wheel means and the pivotal connection of said lever with said second telescopic member of said primary shock absorber, and a secondary shock absorber operatively connected between said sprung masses and said secondary unsprung mass for damping relative movement therebetween, said secondary shock absorber including a first telescopic member which is connected to said first link and a second telescopic member which is connected to said second link, said second telescopic member of said primary shock absorber and said first link of said lever being a part of said secondary sprung mass during stroking of said secondary shock absorber.

References Cited

UNITED STATES PATENTS

Re. 22,255  1/1943  Dowty _____ 244—104

FOREIGN PATENTS 578,365  6/1933  Germany.
123,174  2/1919  Great Britain.
374,300  8/1939  Italy.

MILTON BUCHLER, *Primary Examiner.*

FERGUS S. MIDDLETON, *Examiner.*

P. E. SAUBERER, *Assistant Examiner.*